United States Patent [19]

Schlueter

[11] Patent Number: 5,394,679
[45] Date of Patent: Mar. 7, 1995

[54] COTTON HARVESTER

[75] Inventor: Francis E. Schlueter, Des Moines, Iowa

[73] Assignee: Deere & Company, Molin, Ill.

[21] Appl. No.: 189,391

[22] Filed: Jan. 26, 1994

Related U.S. Application Data

[62] Division of Ser. No. 968,691, Oct. 30, 1992, Pat. No. 5,311,728.

[51] Int. Cl.$^6$ ............................................. D01B 1/02
[52] U.S. Cl. .................................. 56/30; 56/DIG. 8
[58] Field of Search .................. 56/28, 30, 31, 32, 33, 56/12.8, DIG. 8

[56] References Cited

U.S. PATENT DOCUMENTS

| | | | |
|---|---|---|---|
| 3,123,963 | 3/1964 | Horton et al. | 56/33 |
| 3,484,802 | 12/1969 | Reece et al. | 56/33 |
| 5,212,937 | 5/1993 | Fachini et al. | 56/28 |

Primary Examiner—Ramon S. Britts
Assistant Examiner—James A. Lisehora

[57] ABSTRACT

A cotton stripper with an improved row unit having brush rolls and augers with parallel shafts driven by a gear drive. The parallel shafts permit the unit to be narrowed several inches compared with the conventional units. A cut-off member between the brush roll and auger has an edge which runs parallel to the shafts below the axis of the brush roll shaft to break up stalks and facilitate power feeding of stripped material toward the lower part of the auger. The auger housing is formed with angled flat walls for better stalk breakage. Upright forward slots and rear fore-and-aft extending slots in flat auger walls provide increased dirt and trash elimination. The top of the row unit housing is formed with a low friction material that is angled downwardly toward the row receiving area to reduce cotton loss. A separation chamber leading rearwardly from the cross auger outlet to the input of the main vertical duct is open on the bottom with several air assist tubes extending across the proximate end of the opening to float ripe cotton. The tubes have holes which open to direct air toward the main duct input above the distal end of the opening. A reduced output jet in the main duct sucks floated cotton from the chamber, while denser green bolls and other dense debris drop through the opening and out of the conveying path.

14 Claims, 4 Drawing Sheets

COTTON HARVESTER

This application is a division of application Ser. No. 07/968,691, U.S. Pat. No. 5,311,728, filed Oct. 30, 1992.

BACKGROUND OF THE INVENTION

1) Field of the Invention

The present invention relates generally to cotton harvesters and, more specifically, to an improved row unit and cotton delivery system for a cotton stripper.

2) Related Art

Presently available cotton strippers such as the John Deere Model 7445 Cotton Stripper include individual row units supported forwardly of a cross-auger frame. Cotton along with cotton stalks and other debris is swept from the row-receiving area by a pair of brush rolls supported on either side of the row of cotton and angling upwardly in the rearward direction. An auger supported above a rounded auger housing outwardly of each of the brush rolls conveys the material rearwardly to the cross auger. The row unit auger shafts are gear driven, and the axes of the brush roll shafts run at an angle to the axes of the auger shafts. The angled shafts cause point contact on the gear teeth and increased noise and wear. With as many as six units running simultaneously, the noise level can be relatively high.

The row unit width in conventional strippers approaches the minimum row spacing in narrow row cotton so that access to the units for servicing is limited. Providing a narrow stripper unit which still has good picking efficiency and minimal cotton loss has been a continuing source of difficulty.

A cut-off member which runs generally parallel to the brush roll and is located between the brush roll and the corresponding auger has a top portion which extends above the axis of the brush roll. This cut-off is necessary to help direct cotton away from the brush roll and into the auger. However, cotton sometimes stays with the brush roll or is thrown in a direction other than toward the auger, and, as a result, cotton conveying and stalk breakage in the auger are much less than optimal. Often, stalks fail to get broken up between the auger and the housing. When not broken up or removed by the row unit, such debris is a source of blockage of the cotton path.

The typical stripper row unit housing which encloses the brush rolls and auger has a flat top, and loose cotton can bounce off the top and be lost as the plants enter the row-receiving area. In tall cotton, the upper part of the cotton plant bunches up at upper areas of the stripper brush rolls, and as a result, stripping efficiency is reduced.

Separating trash and dense green bolls that are swept into the cotton conveying system by the stripper rolls is necessary for good productivity. A typical method for removing green bolls and other dense material is to allow them to fall to the bottom of the main vertical conveying duct and unto the ground or into a green boll box mounted on the harvester. The standard cotton stripper air system, with an upwardly directed air jet about a third of the way up in the back wall of the main conveying duct, causes a suction that lifts fluffy ripe cotton from the cross auger discharge area toward the jet and then blows ripe cotton upwardly and rearwardly while the denser green bolls drop. One problem with this boll separation approach has been the requirement for a powerful air jet to assure that all ripe cotton will be sucked up from the auger toward the jet, even in high yielding cotton. Often the green bolls are surrounded by and swept up with a mass of ripe cotton and do not get separated. In addition, the air jet is so powerful that cotton and trash can get pushed against the separating grates at the top of the duct to cause a blockage or render the grates useless for separating trash.

BRIEF SUMMARY OF THE INVENTION

It is therefore an object of the present invention to provide an improved cotton harvester that overcomes most or all of the aforementioned problems. It is a further object to provide such a harvester with improved conveying and trash separating ability.

It is yet another object of the invention to provide an improved cotton harvester of the stripper type that has improved cotton conveying and trash separating characteristics compared to at least most previously available cotton strippers. It is a further object to provide such a harvester that more completely separates green bolls from ripe cotton and reduces blockages and clogged grates. It is yet another object to provide such a harvester which requires less output at the air jet on the main cotton conveying duct leading from the cross auger.

It is another object of the invention to provide a cotton conveying system with an improved green boll separating apparatus.

It is still another object to provide an improved row unit for a cotton stripper which overcomes many or all of the aforementioned problems associated with previously available row units. It is a further object to provide such a unit which has improved stripping and cotton handling efficiency, better stalk breakage and trash separating characteristics, and improved feeding of high yielding cotton into the brush rolls with less cotton loss than at least most previously available units.

It is a further object to provide an improved row unit for a cotton stripper which has a better drive arrangement with a significantly lower noise level than most previously available units. It is another object to provide such a unit which is easy to access for maintenance and repair, and easy to adjust transversely for different row spacings.

A cotton stripper is constructed with an improved row unit having brush rolls and augers with parallel shafts driven by a gear drive. In one embodiment the drive is powered directly by a small hydraulic motor mounted on the rear panel of the unit to provide quiet operation and flexibility for adjusting the units transversely on the cross-auger to accommodate different row spacings. The parallel shafts permit the unit to be narrowed several inches compared with the conventional units for easier access for repair and maintenance. In addition, a cut-off member between each brush roll and auger pair has an edge which runs parallel to the shafts and below the axis of the brush roll shaft so that the brush roll power feeds the stripped material toward the lower part of the auger. The cut-off edge location is better optimized with respect to both the brush roll and auger, whereas previously available angled shaft arrangements only permitted cut-off location optimization with respect to one of the shafts, typically the brush roll shaft. The sharp cut-off edge helps break up stalk material. The auger housing, rather than being bent to form a rounded trough, is formed with angled flat walls for better stalk separation and breakage. Increased stalk separation and breakage results in fewer blockages and less debris conveyed to the basket or auxiliary trash separator. A new pattern of apertures in the flat-walled auger housing, including fore-and-aft extending rear slots and forward upright slots, provides increased dirt and trash elimination.

The top of the row unit housing is formed with a low friction material that is angled downwardly toward the row receiving area to help direct loose cotton into the row unit and reduce cotton loss. The front end gathering area of the unit is widened for better funneling action of the plant into the row-receiving area. The improved housing shape along with increased row unit length more evenly distributes the cotton plants along the length of the brush roll for better stripping efficiency.

A rearwardly extending separation chamber connecting the cross auger to the vertical air duct has a lower opening with several transverse air tubes extending across the opening. The tubes have holes which open upwardly and rearwardly to direct air toward the vertical duct to aid in moving the less dense stripped material toward the air jet on the back wall of the vertical duct. This air assist permits the main air jet output at the back wall of the vertical duct to be reduced so that the heavy green bolls and other dense debris can drop through the opening and out of the conveying path while the desired lighter, fluffy cotton is conveyed upwardly. The diminished main jet output also reduces incidence of trash and debris pinning against the separation grates downstream of the jet.

These and other objects, features and advantages of the present invention will become apparent to one skilled in the art upon reading the following detailed description in view of the drawings.

DETAILED DESCRIPTION OF THE DRAWINGS

Figure 1:
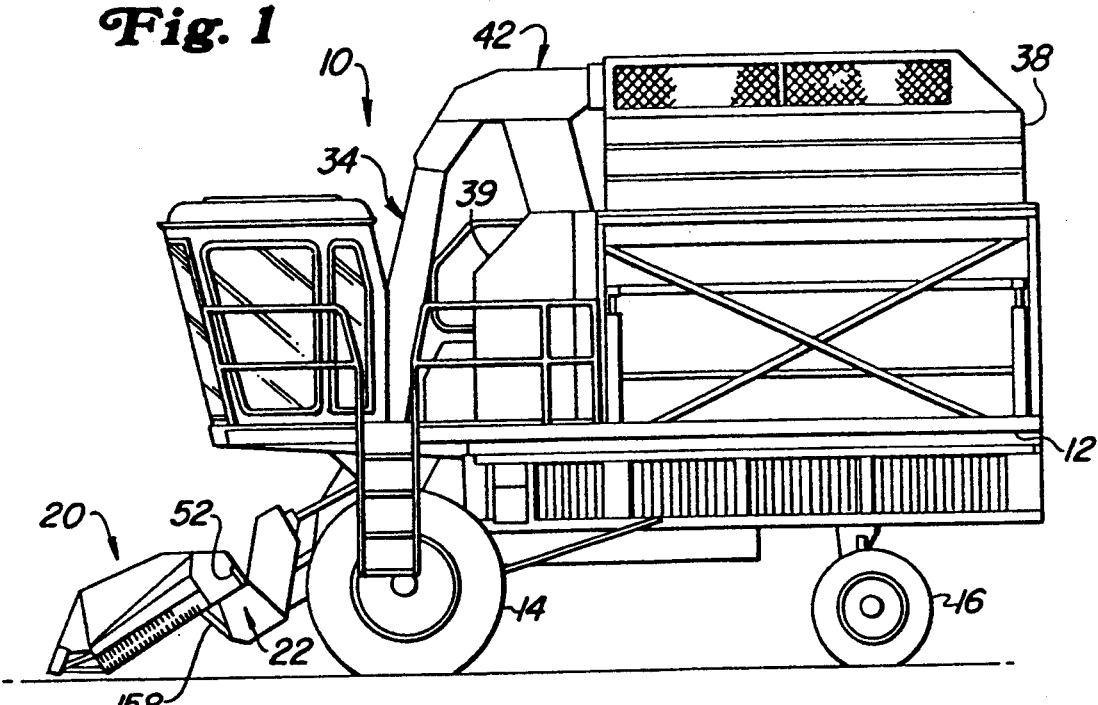
FIG. 1 is a side view of a cotton stripper with the improved row unit and cotton delivery system of the present invention attached thereto.
Figure 5:
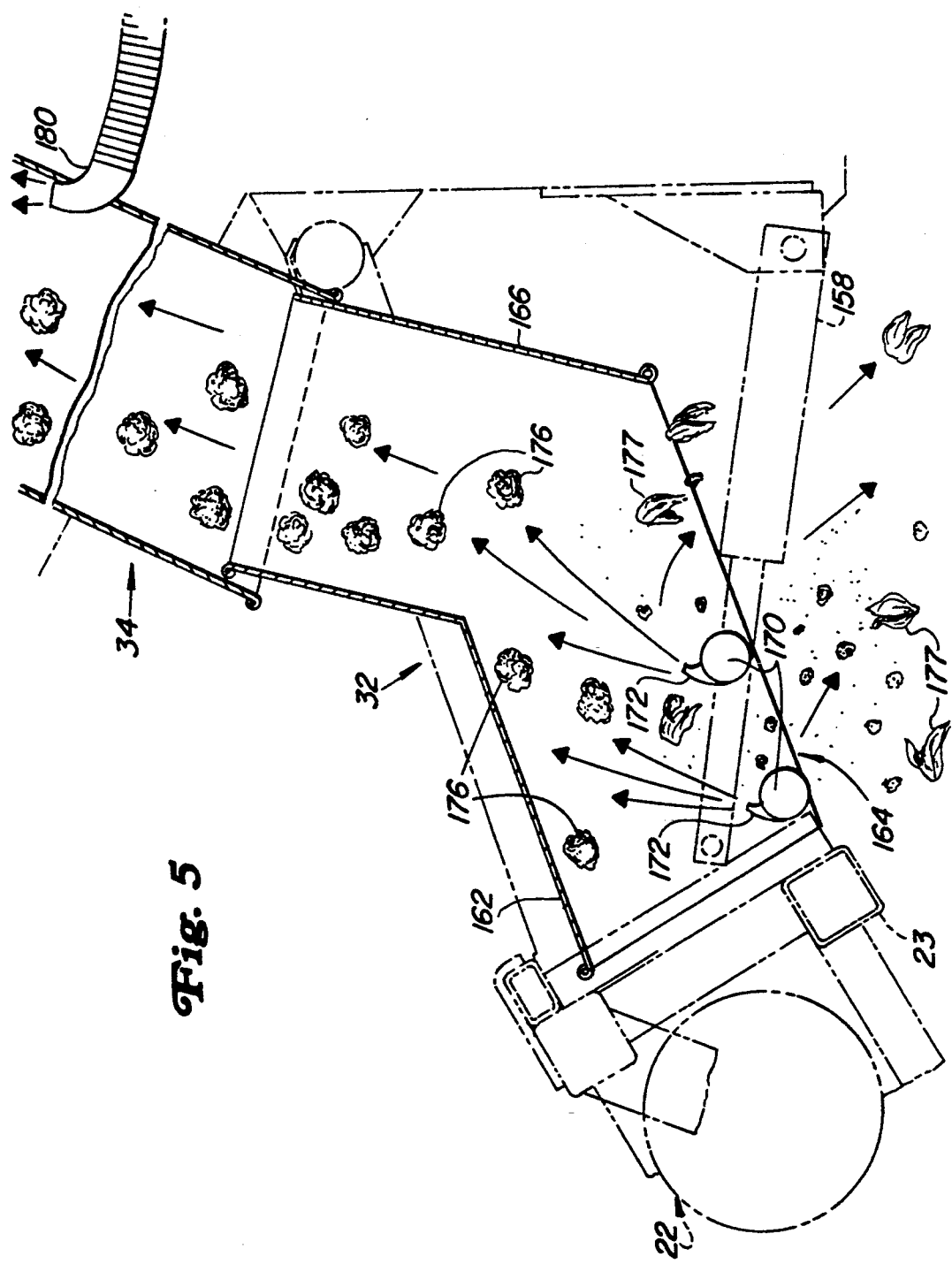
FIG. 5 is a side view, partially in section, showing the improved dense debris separator arrangement at the lower end of the main cotton conveying duct.

Referring now to FIG. 1, therein is shown a cotton harvester 10 of the stripper type having a main frame 12 supported by front drive wheels 14 and rear steerable wheels 16 for forward movement through a field planted with parallel rows of cotton plants. A plurality of stripper row units 20 are supported from a transversely extending cross-auger or main conveyor 22 having a cross auger frame 23 connected by lift arms on the front of the frame 12. The units 20 include stripping structure 26 for removing portions of the cotton plants from the row, and conveying structure 28 for carrying the removed material rearwardly and depositing the material into the cross-auger 22. The cross-auger 22 includes counter-rotating flights for moving the deposited material to a central outlet location at the rear of the auger 22. A dense material separating chamber 32 (FIG. 5) connects the auger outlet with the input to the main upright duct 34 leading to the harvester basket 38 and/or cleaner 39 supported on the frame 12. Material is conveyed by air upwardly and rearwardly to upper grate structure 42 and then rearwardly into the basket 38 or downwardly into the cleaner 39.

Figure 2:
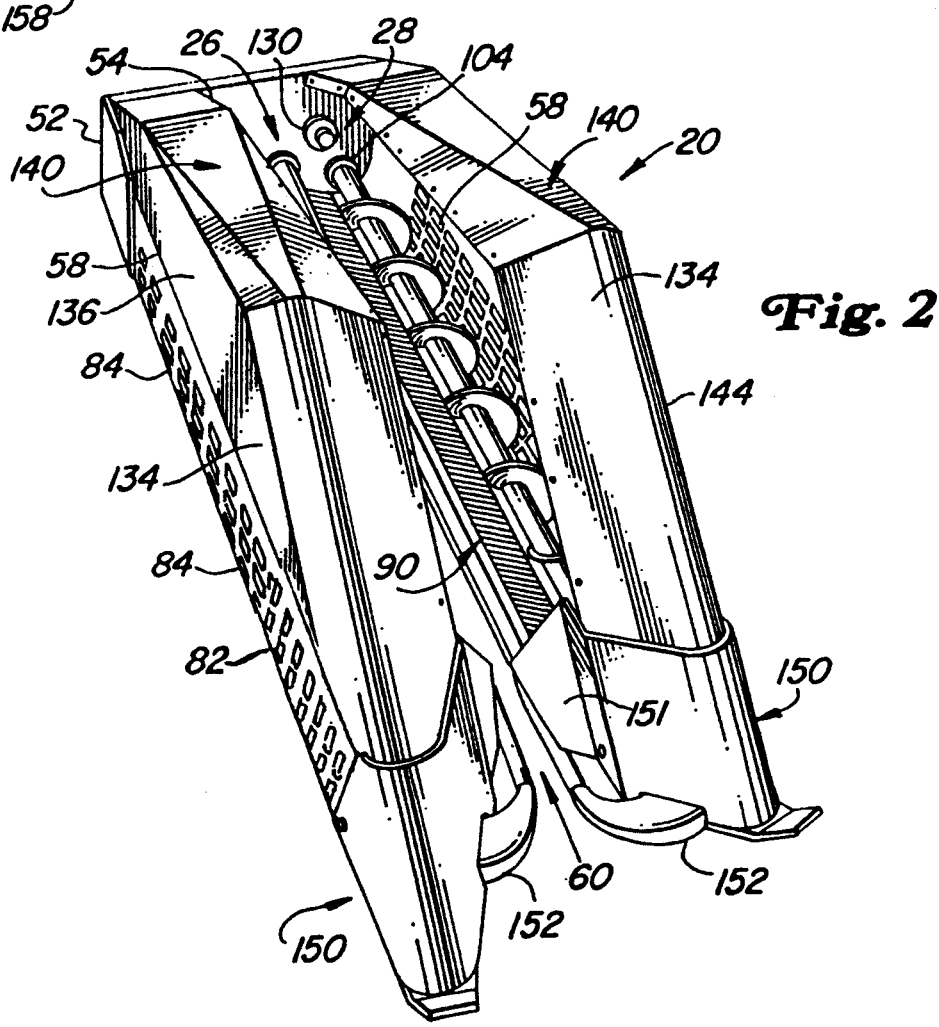
FIG. 2 is a perspective view of one of the row units for the harvester of FIG. 1.
Figure 3:
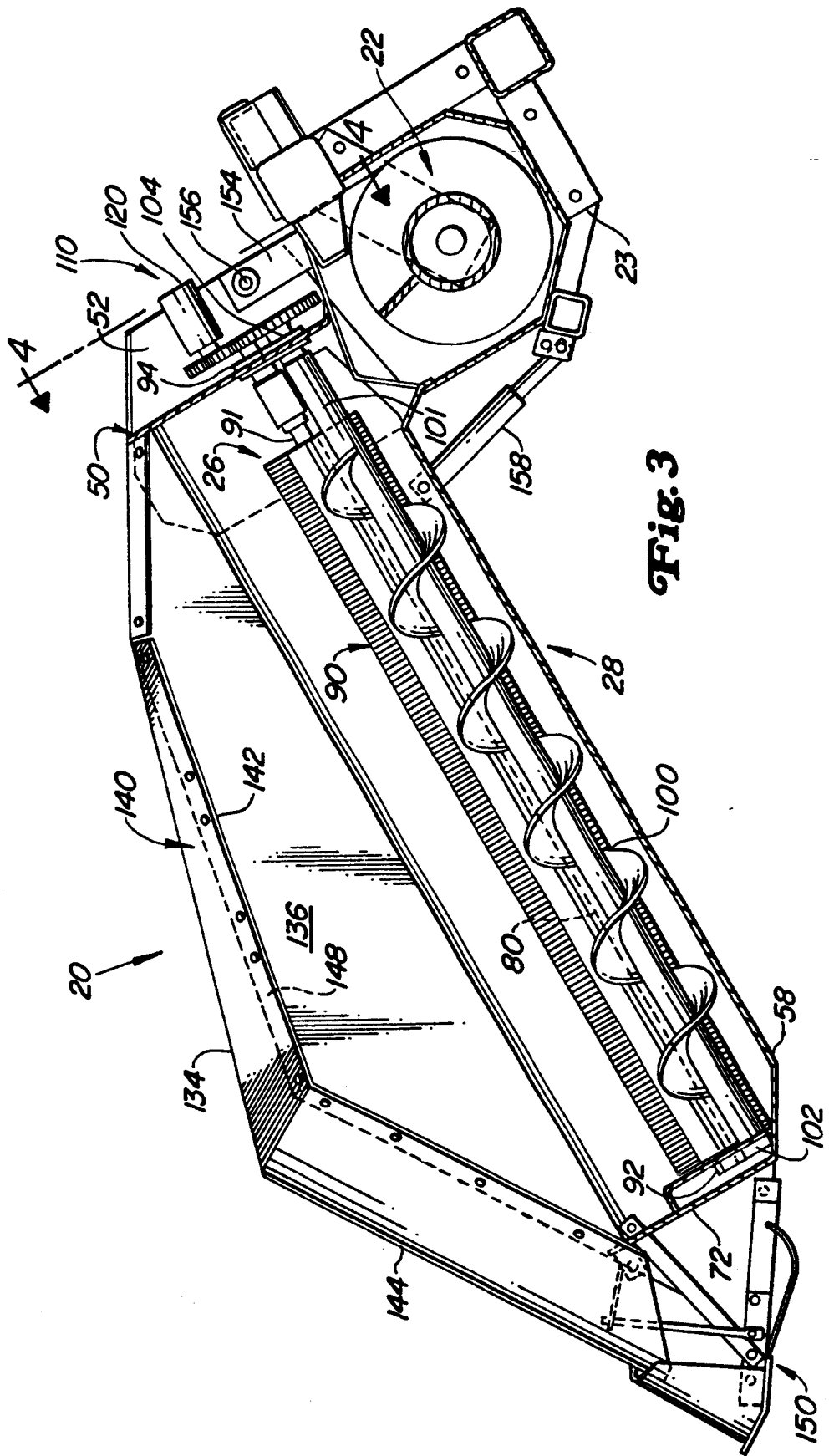
FIG. 3 is a side view, partially in section, of the row unit of FIG. 2 and a portion of the cross-auger.
Figure 4:
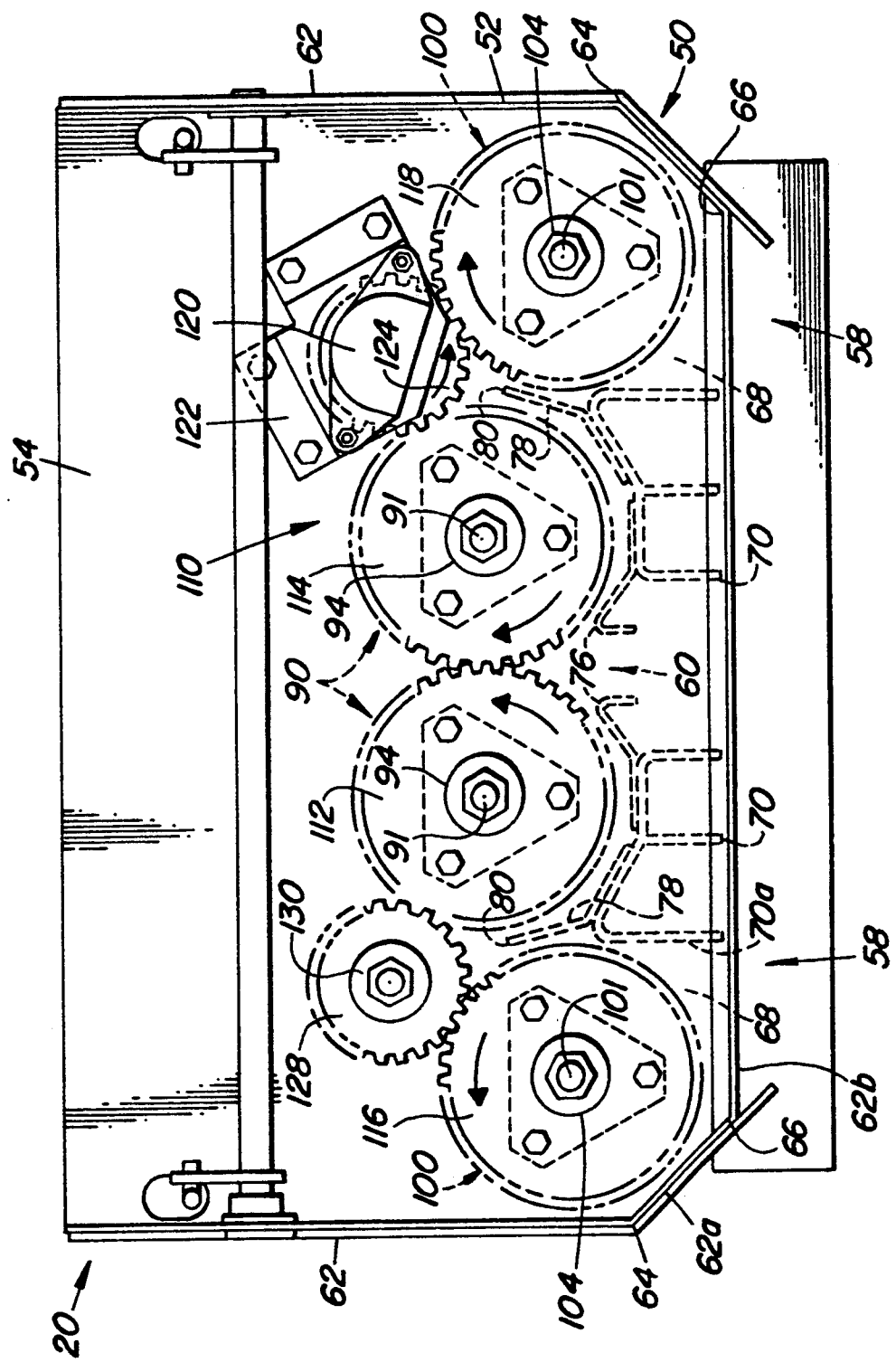
FIG. 4 is a rear view of the row unit of FIG. 2 taken generally along lines 4—4 of FIG. 3 and parallel to the axes of rotation of the row unit auger and brush roll shafts.

As best seen in FIGS. 2–4, the row unit 20 includes a frame assembly 50 having a rear structural member 52 with an upright transverse rear panel 54. A pair of transversely spaced supports 58 are cantilevered from the lower portion of the rear structural member 52 and extend forwardly to define a central row-receiving area 60. Each of the supports 58 includes planar side wall 62 which extends vertically to bend location 64 where an angled planar wall 62a (FIG. 4) extends downwardly at an angle of 45° with respect to the wall 62. At a second bend location 66 a planar bottom 62b extends inwardly 45° from the wall 62a to define a flat-walled auger trough area 68. Channel members 70 fixed at their aft ends to the rear structural member 52 extend forwardly on either side of the row-receiving area 60 to front wall structure 72 (FIG. 3). The outermost portion of each of the channel members 70 defines an inside planar wall 72a of the auger trough area 68. Fore-and-aft extending angles 76 are fixed to channel members 70 on either side of the row-receiving area 60. A cut-off member 78 having a straight cut-off edge 80 is fixed to the outermost side of each of the channel members 70 with the edge 80 projecting above the channel member.

Upright slots 82 (FIG. 2) elongated in a direction perpendicular to the forward direction are formed in the trough walls 62 near the forward end of the unit 20. Slots 84, which are perpendicular to the slots 82 and parallel to the forward direction, are provided rearwardly of the slots 82.

On each side of the row-receiving area 60, a generally conventional brush or stripper roll 90 is supported for rotation about the axis of a fore-and-aft extending stripper roll shaft 91 by an adjustable forward bearing 92 connected to the front wall structure 72 and by a rear bearing 94 fixed to the rear panel 54. The stripper roll 90 is generally of conventional construction (rows of brushes, or alternating brushes and rubber bats) with the exception that the length of the roll is several inches more than is customary to provide improved stripping in tall, high yield cotton. The shaft 91 projects rearwardly through the panel 54 with the shaft axis substantially perpendicular to the plane of the panel 54. The cut-off edge 80 extends parallel to the axis of the shaft 91 and as best seen in FIGS. 3 and 4 is offset below the shaft axis.

Outwardly of each stripper roll 90, an auger 100 with a shaft 101 is supported for rotation above the corresponding auger trough 68 by a forward bearing 102 fixed to the front wall structure 72, and by a rear bearing 104 supported on the rear panel 54. The auger shaft 101 is substantially parallel to and offset below the stripper roll shaft 91 and the cut-off edge 80 and projects through the rear panel 54. The cut-off edge 80 extends slightly above an imaginary plane which passes through and is parallel to the axes of the shafts 91 and 101.

Stripper roll and auger drive structure 110 includes gears 112, 114 (FIG. 4) fixed to the shafts 91 and gears 116, 118 fixed to the shafts 101 for rotation about parallel axes. The gears 112–118 lie generally in a plane parallel to and offset rearwardly of the rear panel 54. The gear 112 meshes with the gear 114 so that the stripper rolls 90 counter-rotate up from the row-receiving area 60. A hydraulic motor 120 is connected by a bracket 122 to the rear panel 54 and includes a drive gear 124 which meshes with the gears 114 and 118 to drive the right-hand (FIG. 4) stripper roll 90 and auger 100 in the clockwise direction, and the left-hand stripper roll 90 in the counter-clockwise direction. An idler gear 128 supported from the panel 54 by a bearing 130 for rotation about an axis parallel to the auger and stripper roll axes provides counter-clockwise drive from the stripper roll gear 112 to the auger gear 116. The motor 120 is connected to a source of hydraulic fluid under pressure (not shown) on the harvester 10.

Row unit covers 134 (FIGS. 2 and 3) are supported by the row unit frame assembly 50 on either side of the row-receiving area 60 above the supports 58. Each of the covers 134 includes an upright side wall 136 extending forwardly from the rear structural member 52 to the front of the support 58. An upper gatherer sheet or panel 140 extends forwardly from the member 52 and inwardly from the wall 136 to an inner edge 142 offset above the row receiving area 60. A front gatherer sheet or panel 144 extends downwardly from the panel 140. A flanged support member 148 connected between the edge 142 and the wall 136 provides unit cover strength and support for the gatherer panel 144. The panel 140 is preferably fabricated from a lightweight plastic with a low friction surface and slopes downwardly from the wall 136 toward the inside of the unit for reduced cotton loss and low weight. The gatherer panel 144 slopes inwardly and rearwardly to provide a wide throat area that funnels cotton plants easily into the row-receiving area 60. The gatherer panel 144 may also be fabricated from plastic to reduce weight. A forward gathering shoe assembly 150 is pivotally connected to the support 58 for rocking about a generally transverse axis to follow the ground contour. The inner portion of the assembly 150 includes inwardly and upwardly converging plant guides 151 (FIG. 2) for positioning lower portions of the plant with respect to the stripper rolls. Additional lower guides 152 extend inwardly and rearwardly from the front of the unit to channel the lower portion of the cotton plants into the row-receiving area 60.

The row unit 20 is pivotally connected to the cross auger frame 23 by a bracket 154 (FIG. 3) for rocking about an axis 156. A height control cylinder 158 is connected between the lower portion of the row unit frame assembly 50 and the cross auger frame 23 for pivoting the unit about the axis 156. The harvester header which includes the cross auger 22 and row units 20 is connected by conventional hydraulically controlled lift arm structure to the harvester frame 12 for raising and lowering the row units 20.

The separation chamber 32 is supported from the harvester frame 12 and pivots about the lift arm pivotal axis with the header as the cross auger 22 is raised and lowered. A forward and substantially horizontally extending portion 162 of the separation chamber 32 communicates with the auger outlet and has a lower opening 164. An upright portion 166 angles upwardly and projects into the lower end of the duct 34 above the distal end of the opening 164. Spaced transverse air tubes 170 of diameter preferably on the order of three inches extend across the width of the proximate end of the opening 164 and include rearwardly and upwardly directed air outlets 172. The tubes 170 are connected to a source of air (not shown) on the harvester. The outlets 172, which in an alternate embodiment may simply be holes formed in the tubes, extend generally the width of the opening 164 and provide a current or flow of air with sufficient lift in the horizontal run to float the ripe cotton (see 176 of FIG. 5) while the denser materials such as green bolls (177) fall through the opening 164. The main air jet 180 which is located about a third of the way up in the rear wall of the duct 34 provides sufficient suction at the lower end of the duct 34 to lift the ripe cotton. The air tubes 170 permit the air output at the jet 180 to be reduced from that which would otherwise be necessary to convey high yielding cotton so that fewer green bolls and the like are drawn into the duct 34, and so that trash is less likely to pin against and clog the grates 42 at the upper end of the duct.

In operation, the cotton plants enter the row-receiving area 60 where the counter-rotating stripper rolls 90 strip cotton bolls and stalk material from the plants and propel the stripped material over the cut-off member 78 toward the augers 100. The cut-off member 78 prevents cotton from sticking to the adjacent stripper roll 90, and the edge 80 helps break up stalk material. The augers 100 convey the stripped material rearwardly, and the auger housing slots 82 facilitate removal of dirt from the trough area 68. The slots 84 facilitate stalk breakage and removal. The planar angled walls of the auger troughs help assure stalk breakage and help optimize material-location in the trough for better conveying and cleaning action. The augers 100 direct the rearwardly conveyed material downwardly through rear openings in the row unit and into the cross-auger 22 where counter-rotating flights move the material to the central outlet which opens into the separating chamber 32. The air current from the tubes 170 near the cross-auger outlet lifts and propels the fluffy ripe cotton rearwardly along the chamber 32 and upwardly toward the bottom of the duct 34 where the suction created by the jet 180 moves the cotton upwardly. Heavier material such as green bolls fall through the opening 164 of the separation chamber.

Having described the preferred embodiment, it will become apparent that various modifications can be made without departing from the scope of the invention as defined in the accompanying claims.

What is claimed is:

1. In a cotton harvester having a main frame supported for forward movement through a field of cotton planted in parallel rows, a row unit for stripping cotton from a row of plants and delivering stripped cotton and plant debris rearwardly to a main conveyor, and an upright duct having a bottom and an air jet located above the bottom of the duct for propelling cotton upwardly from the main conveyor, cotton separating and conveying structure comprising:

a row unit housing supported by the frame forwardly of the main conveyor;

fore-and-aft extending stripper roll structure including stripper rolls supported for rotation about fore-and-aft extending axes in the row unit housing and defining a row receiving area;

fore-and-aft extending conveyor structure offset from the stripper roll structure for conveying stripped ripe cotton, green cotton bolls and debris including stalks rearwardly, and including means for breaking up a portion of the debris and separating some of the debris from the cotton as it moves towards the main conveyor; and means for separating green cotton bolls and other dense debris from the ripe cotton including an opening adjacent the bottom of the upright duct and air assist structure supported adjacent the bottom of the duct, the air assist structure including an air tube having an outlet opening upwardly and providing a flow of air upwardly toward the air jet to lift ripe cotton and permit green cotton bolls and other dense debris to drop through the opening.

2. The invention as set forth in claim 1 wherein the opening has a proximate end or preselected width adjacent the main conveyor and a distal end offset from the conveyor, and wherein the air assist structure comprises an air tube supported at the proximate end Of the opening.

3. The invention as set forth in claim 2 wherein the air tube extends the width of the proximate end.

4. The invention as set forth in claim 1 wherein the means for breaking up a portion of the debris and separating some of the debris from the cotton as it moves towards the main conveyor includes an auger trough having at least one flat wall extending in the fore-and-aft direction, and an auger supported adjacent to the trough for rotation about a fore-and-aft extending axis.

5. The invention as set forth in claim 4 wherein the means for breaking up a portion of the debris and separating some of the debris from the cotton as it moves towards the main conveyor includes a fore-and-aft extending planar auger trough sidewall having a plurality of slots.

6. The invention as set forth in claim 1 wherein the conveyor structure includes augers having rotational axes parallel to the axes of the stripper rolls and cut-off means located between the rolls and the augers defining edges running parallel to the auger axes for breaking up stalks and effecting power delivery of stripped material towards the augers.

7. The invention as set forth in claim 1 wherein the row unit housing includes outer upright sidewalls and upper gathering structure extending inwardly from the sidewall structure towards the row-receiving area, the gathering structure sloping downwardly towards the row-receiving area to facilitate recovery of loose cotton from outside the housing.

8. The invention as set forth in claim 7 wherein the gathering structure is fabricated from a light-weight, low friction plastic material.

9. In a cotton conveying system having a first conveyor for directing ripe cotton and green cotton bolls to a conveyor outlet location, and a main duct for pneumatically conveying the cotton to cleaning structure, structure for separating dense material such as green cotton bolls from the ripe cotton comprising:

a separation chamber comprising a substantial horizontal component with a downwardly directed opening, the separation chamber including an input end communicating with the conveyor outlet location on one side of the opening, an output end communicating with the main duct on the opposite side of the opening, the separation chamber further comprising means providing an air current adjacent the input end and directed toward the output end for lifting and moving ripe cotton over the opening toward the output end and into the main duct while denser material drops through the opening.

10. The invention as set forth in claim 9 wherein the main duct is upright and includes an air jet nozzle for pneumatically conveying material upwardly from the output end of the separation chamber, and means for providing a flow of air through the nozzle sufficient to lift ripe cotton lifted and moved by the separation chamber air current but insufficient to lift green cotton bolls from the chamber.

11. The invention as set forth in claim 10 wherein at least a portion of the opening is in alignment with the main duct.

12. The invention as set forth in claim 9 wherein the means for providing an air current comprises an air tube extending across the opening adjacent the input end of the separation chamber.

13. In a cotton harvester having a main frame supported for forward movement through a field of cotton planted in parallel rows, a row unit for stripping cotton from a row of plants and delivering stripped cotton and plant debris rearwardly to a first conveyor, and an upright duct having a bottom and an air jet located above the bottom of the duct for propelling cotton upwardly from the first conveyor, cotton separating and conveying structure comprising:

a row unit housing supported by the frame forwardly of the conveyor;

fore-and-aft extending stripper roll structure including stripper rolls supported for rotation about fore-and-aft extending axes in the row unit housing and defining a row receiving area;

fore-and-aft extending conveyor structure offset from the stripper roll structure for conveying stripped ripe cotton, green cotton bolls and debris including stalks rearwardly, and including means for breaking up a portion of the debris and separating some of the debris from the cotton as it moves towards the first conveyor; and means for separating green cotton bolls and other dense debris from the ripe cotton including an opening adjacent the lower end of the upright duct and air assist means supported adjacent the opening for providing an upwardly directed flow of air and for directing ripe cotton upwardly toward the air jet while permitting green cotton bolls and other dense debris to drop through the opening, wherein the air assist means comprises at least two spaced tubes having a plurality of upwardly directed openings.

14. The invention as set forth in claim 13 wherein the air assist means comprises air tubes extending across the opening.

* * * * *